TAPE APPARATUS SYNCHRONIZING SYSTEM

Filed April 21, 1960 8 Sheets-Sheet 1

HAROLD V. CLARK &
DONALD B. MACLEOD
INVENTORS

BY Nathan N. Kallman

ATTORNEY

TAPE APPARATUS SYNCHRONIZING SYSTEM

Filed April 21, 1960 8 Sheets-Sheet 2

HAROLD V. CLARK &
DONALD B. MACLEOD
INVENTORS

BY Nathan N. Kallman

ATTORNEY

Jan. 16, 1962 H. V. CLARK ET AL 3,017,462

TAPE APPARATUS SYNCHRONIZING SYSTEM

Filed April 21, 1960 8 Sheets-Sheet 3

HAROLD V. CLARK &
DONALD B. MACLEOD
INVENTORS

BY Nathan N. Kallman

ATTORNEY

Jan. 16, 1962 H. V. CLARK ET AL 3,017,462

TAPE APPARATUS SYNCHRONIZING SYSTEM

Filed April 21, 1960 8 Sheets-Sheet 4

HAROLD V. CLARK &
DONALD B. MACLEOD
INVENTORS

BY Nathan N. Kallman

ATTORNEY

TAPE APPARATUS SYNCHRONIZING SYSTEM

Filed April 21, 1960 8 Sheets-Sheet 5

HAROLD V. CLARK &
DONALD B. MACLEOD
INVENTORS

BY Nathan N. Kallman

ATTORNEY

TAPE APPARATUS SYNCHRONIZING SYSTEM

Filed April 21, 1960 8 Sheets-Sheet 6

HAROLD V. CLARK &
DONALD B. MACLEOD
INVENTORS

BY Nathan N. Kallman
ATTORNEY

HAROLD V. CLARK &
DONALD B. MACLEOD
INVENTORS
BY Nathan N. Kallman
ATTORNEY

HAROLD V. CLARK &
DONALD B. MACLEOD
INVENTOR.
BY Nathan N. Kallman
ATTORNEY

United States Patent Office 3,017,462
Patented Jan. 16, 1962

3,017,462
TAPE APPARATUS SYNCHRONIZING SYSTEM

Harold V. Clark, Menlo Park, and Donald B. MacLeod, Redwood City, Calif., assignors to Ampex Corporation, Redwood City, Calif., a corporation of California Filed Apr. 21, 1960, Ser. No. 23,835
5 Claims. (Cl. 178—69.5)

This invention relates to a signal synchronizing system, and in particular to a signal synchronizing system useful for synchronizing information derived from a prerecorded magnetic tape with information derived from another source.

The synchronizing system of this invention is generally applicable to systems wherein a plurality of synchronizing signals are employed to maintain the reception or transmission of signal information from one source in synchronism with signal information derived from another independent source. Since this synchronizing system is particularly useful for synchronizing television signals, the description of this invention hereafter will be explained in connection with a television transmission system. It will be apparent to those skilled in the art that the synchronizing system of this invention is, of course equally useful in connection with computer instrumentation and automation systems, that is any systems which employ an information storage medium that is to be scanned for recording and playback, and which require synchronizing during such scanning with information presented from another source.

Television signal information for transmission may be derived from many sources, such as a television camera employing an image orthicon or vidicon for pickup of a live show in the studio, or from a magnetic tape apparatus having a recorded tape carrying signal information, for example. Very often, it is desired to interpose different programming material which requires switching from one type of equipment to another, or from a network studio to a local studio, for example. A large percentage of such material which is to be integrated into the studio programming is recorded on magnetic tape.

In the prior art, when there was switching between a television magnetic tape recorder and another television signal source, it was difficult to synchronize the signal reproduced from the tape with sufficient accuracy. Such lack of synchronization resulted generally in rollover of the picture displayed on the television receiver raster. In addition, the studio could not easily introduce desirable effects such as fading in or fading out of the picture, mixing of two or more signals, split screen display, and other special effects that require proper synchronization during television transmission.

During playback the video signal recorded on tape must be closely synchronzied with the preceding and following televised video signals derived from information processing apparatus other than the tape recorder and reproducer. It is known that the time base stability of a television image that is reproduced from a magnetic tape recorder is directly dependent upon the uniformity of angular velocity of the rotating scanning drum carrying the magnetic scanning heads or transducers. Therefore, to accomplish the desired synchronization, extremely precise control of the speed of the driving motor which controls the rotational velocity of the scanning drum is necessary.

In one type of magnetic tape apparatus, a hysteresis type synchronous motor is employed to drive the scanning drum. Precise synchronization of such a synchronous motor has been found to be difficult in the past.

It is an object of this invention to provide a synchronizing system which affords precise synchronization between a magnetic tape apparatus and another independent information processing apparatus.

It is another object of this invention to provide an improved television signal transmission system.

It is another object of this invention to synchronize a video signal derived from a magnetic tape apparatus with a video signal derived from another source.

It is a further object of this invention to provide synchronizing means in a television transmission system that allows mixing of signals from two independent signal sources, fading, split screen display, and other special effects.

It is a further object of this invention to provide a rapid correction to a driving motor thereby controlling the time base accuracy of a video scanning drum in a magnetic tape apparatus.

It is a still further object to provide for precise synchronization of a hysteresis synchronous motor employed for driving a video scanning drum.

For the purpose of convenience, the term "sync" will be used hereinafter to define synchronizing information, synchronizing signals, or synchronizing pulses.

In accordance with one embodiment of this invention, a signal synchronizing system is provided for synchronizing a magnetic tape apparatus with another independent information processing apparatus. The synchronizing system receives a sync signal from the magnetic tape apparatus comprising a plurality of sync components. The sync signal is separated into at least a first sync component and a second sync component, the second sync component having a substantially greater frequency than the first sync component. A reference signal is applied to a separator to provide a first reference sync component and a second reference sync component, corresponding respectively to the first and second sync components derived from the magnetic tape apparatus. The separated first sync components are applied to a comparator to produce a first error control signal. The separated second sync components are then compared and a second error control signal is derived. These error control signals are utilized to vary the rotational velocity of a scanning means of the tape apparatus to synchronize the presentation of information from the tape with another source of signal information which is in synchronism with such reference sync signals.

As applied to television transmission, the sync signal components may be the horizontal and vertical sync components of a composite video information signal which is pre-recorded on a magnetic tape. The reference horizontal and vertical sync components may be derived from a reference signal source such as a local studio reference sync generator or a network master sync generator. The vertical sync components are compared in a phase comparator to derive a coarse control signal which is utilized to vary the speed of a scanning head assembly drum of a magnetic tape apparatus. Similarly, the horizontal sync components are compared, and any phase or frequency errors between the reference horizontal sync and the video information signal horizontal sync provides a fine control signal. Because the horizontal sync occurs at 15,750 cycles per second, instantaneous positional information from the video scanning drum representing small rotational movements may be obtained. This information is utilized to apply high speed servo control responsive to the control signals to vary the rotational volocity of the scanning drum thereby synchronizing the tape apparatus with the television transmission system.

The invention will be described in greater detail with reference to the drawings in which.

Figure 1:
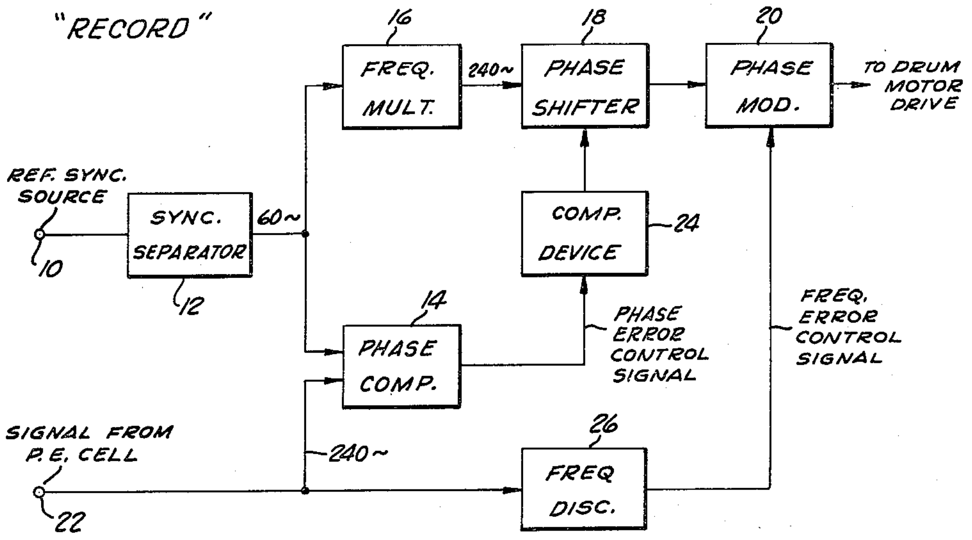
FIGURE 1 is a simplified block diagram illustrating the operation of the synchronizing system during the "Record" mode, according to the invention.

FIGURES 3(*a*) and 3(*b*) (on two sheets of the drawing) are detailed functional representations of the synchronizing system, in a block diagram; and FIGURES 4–8 inclusive show signal waveforms which are developed during the operation of such synchronizing system.

In FIGURE 1, a simplified block diagram illustrates generally the operation of the synchronizing system of this invention during the "Record" mode. A reference signal 10, which may be derived from a local reference sync generator for example, is passed through a sync separator 12, from which a 60 cycle vertical sync component is recovered. The 60 cycle vertical sync signal is applied to a phase comparator 14, and to a frequency mulitplier 16 which develops a 240 cycle sine wave signal. The 240 cycle sine wave signal is applied to a phase shifter 18 which varies the phase of such signal whenever an error control signal is developed at phase comparator 14.

To develop such an error control signal, a 240 cycle signal is developed in a known manner by a photoelectric cell coacting with a timing ring disposed on a scanning head drum assembly of a magnetic tape apparatus. The timing ring, which is half black and half white, reflects light from the white portion to the photoelectric cell during one half of the drum's rotation cycle thereby producing a square wave signal, having a frequency of substantially 240 cycles. This signal which is derived from the photoelectric cell is applied from a terminal 22 to phase comparator 14 wherein the signal is compared in phase to the 60 cycle pulse from sync separator 12. Any phase error is detected and an error control signal is produced to actuate a compensating device 24 such as a resolver motor for driving phase shifter 18, which may be an electro-mechanical resolver, for example. The output of phase shifter 18 is coupled to a driving motor for scanning drum through a phase modulator 20 to vary the rotational velocity of the rotating drum, if necessary.

The 240 cycle square wave signal from the photoelectric cell is also applied to a frequency discriminator 26 which is basically a damping circuit that acts as a rate change detector for developing a frequency error control signal used to control phase modulator 20. During the "Record" operation, maximum uniformity of the rotational velocity of the scanning drum and precise physical position of the drum with reference to specific information in the composite video signal is achieved. Therefore, during the "Playback" operation, the specific information is utilized to determine the precise position of the scanning drum, and to vary the rotational velocity thereof so that the video signal may be represented in synchronism with another source of signal information.

Figure 2:
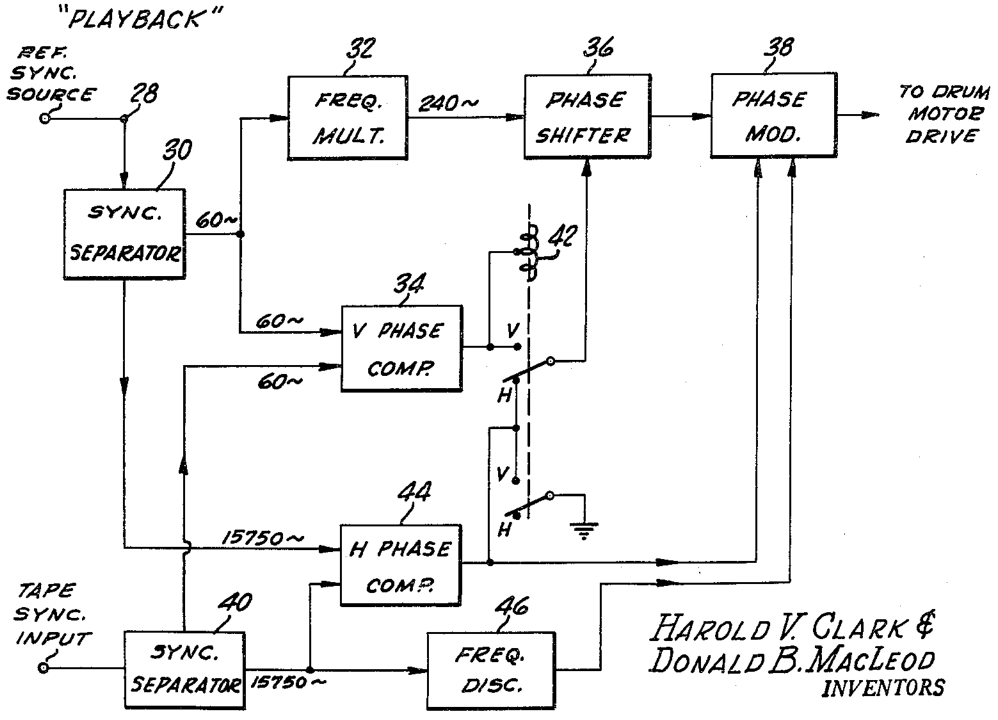
FIGURE 2 is a simplified block diagram illustrating the operation of the synchronizing system during the "Playback" mode, in accordance with the invention.

In the "Playback" mode of the synchronizing system, illustrated in simplified form in FIGURE 2, a reference signal is derived from a reference source 28, such as a sync generator, and is channeled to a sync separator 30 for separation into 60 cycle vertical and 15,750 cycle horizontal sync components. The 60 cycle vertical sync component is fed to a frequency multiplier 32 and to a vertical phase comparator 34. The frequency multiplier 32 converts the 60 cycle signal to a 240 cycle control signal which is applied through a phase shifter 36 and a phase modulator 38 to control the rotational velocity of a driving motor coupled to a magnetic tape scanning drum.

Simultaneously, a sync signal is derived from the composite signal recorded on the tape and applied to a sync separator 40 for separation into vertical and horizontal sync components to be used for comparison with the reference sync components. The 60 cycle vertical sync component is compared in the vertical phase comparator 34, and any error control signal which is developed therein actuates an error signal relay 42. The relay 42 in turn switches the error control signal output to the phase shifter 36 whereby proper vertical framing is effected. The phase shifter 36 varies the phase of the 240 cycle control signal which is applied to a driving motor in accordance with the amplitude of the control signal.

The horizontal sync component derived from the tape is then compared with the horizontal sync component derived from the reference sync source 28 in a horizontal phase comparator 44, and the phase error signal which results is applied directly to the phase modulator 38. This high speed phase error signal which results from the comparison of the horizontal sync signals affords small instantaneous corrections which maintain the angular velocity of the driving motor and the scanning drum within narrow tolerances.

It is noted that when the vertical phase comparator 34 is producing an error control signal, the error control signal relay 42 is switched to provide grounding of the horizontal phase comparator 44 which results in maintaining the input to the phase modulator 38 in a steady state condition.

In addition, a frequency discriminator 46 is provided which serves as a rate change detector to develop a frequency error signal for controlling the phase modulator 38, in the same manner as described for the "Record" mode.

With a synchronizing system of this type, it is possible to maintain a time coincidence between reference sync and tape sync of approximately .1 microsecond for periods under 1 second, and a long term stability of .2 microsecond for periods of 1 minute or more.

Figure 3A:
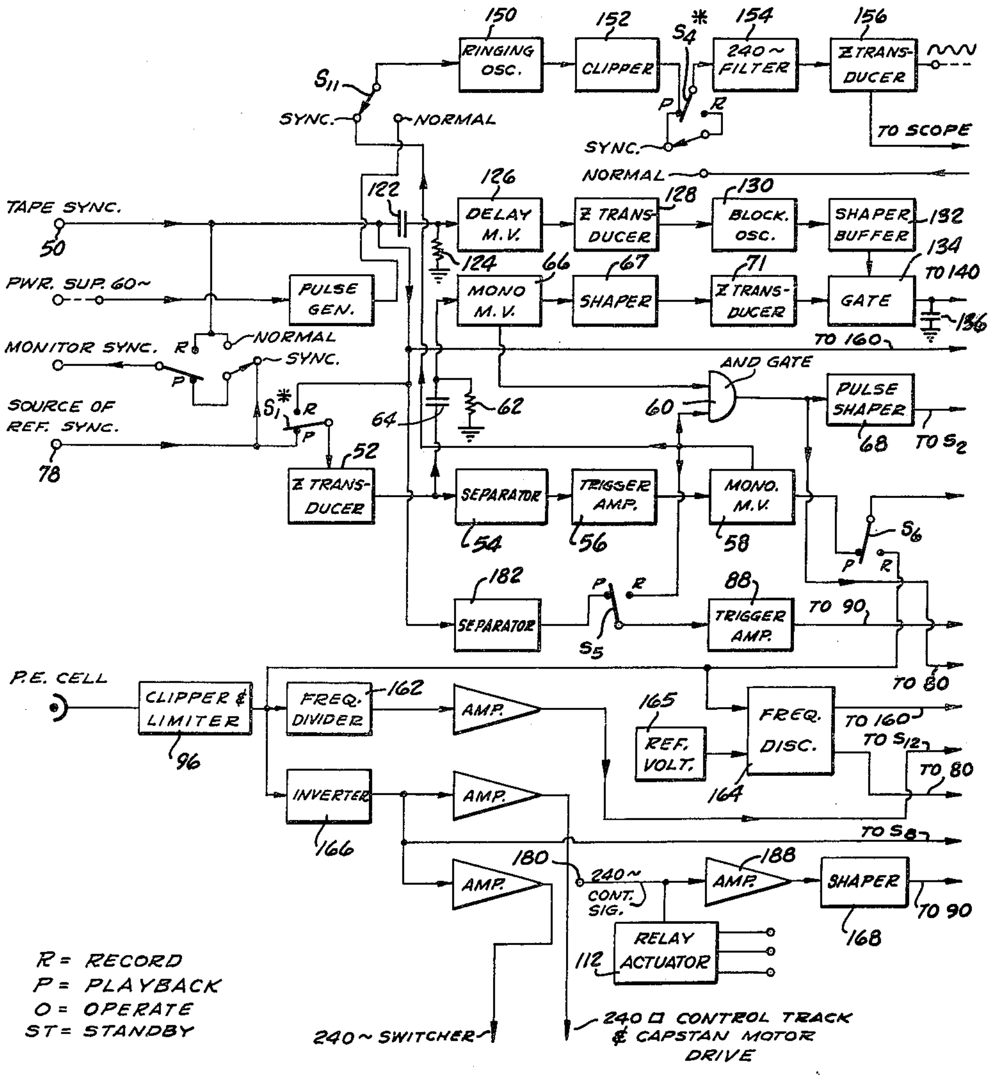
Figure 3B:
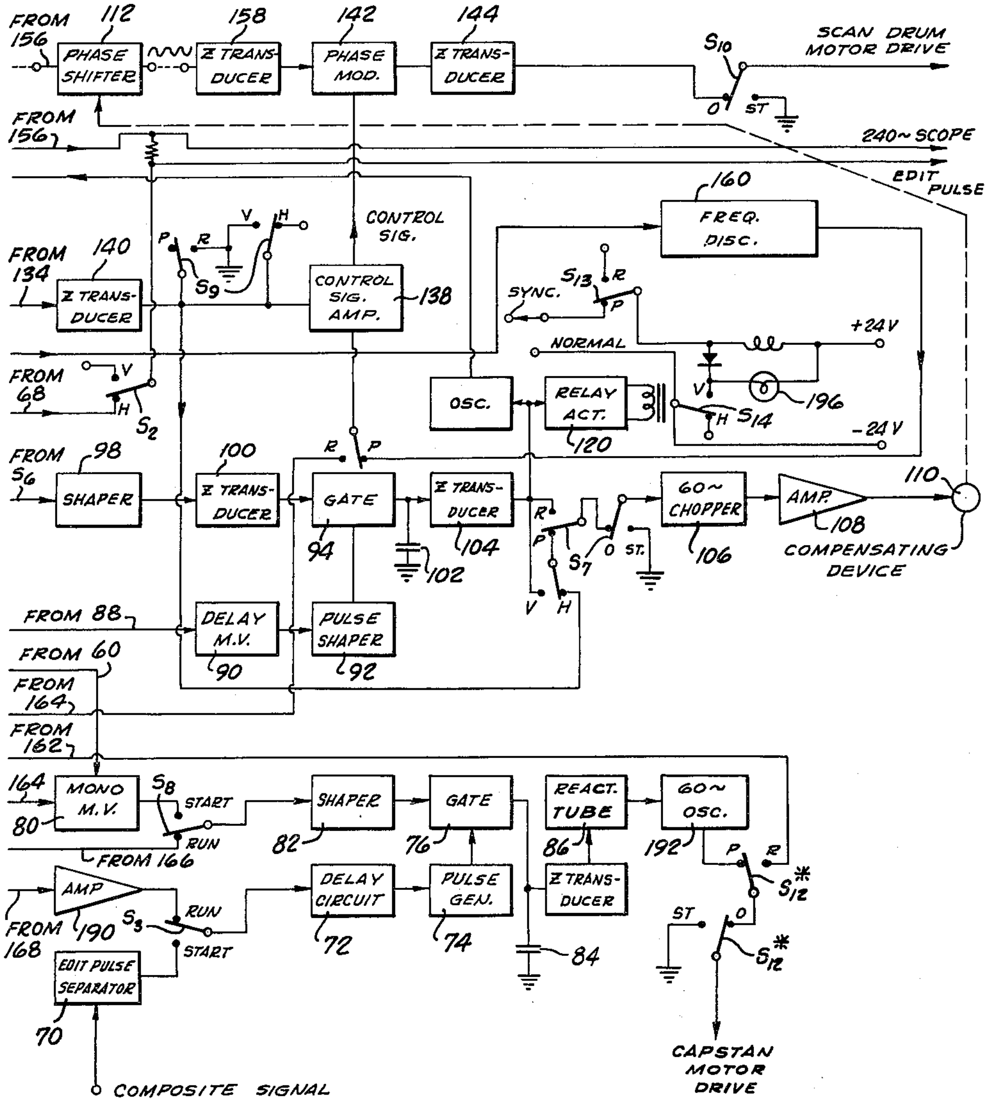
Figure 4:
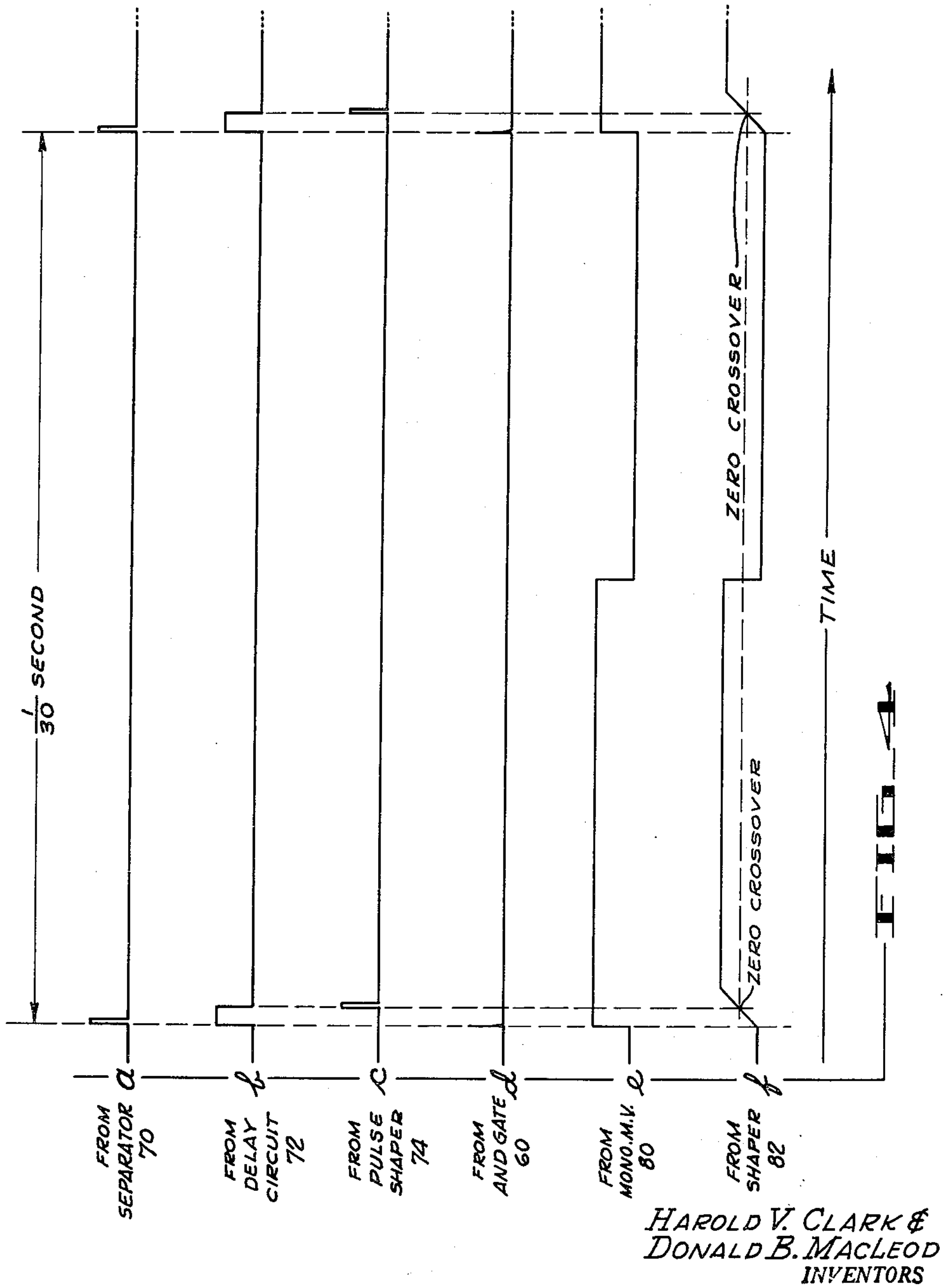
Figure 5:
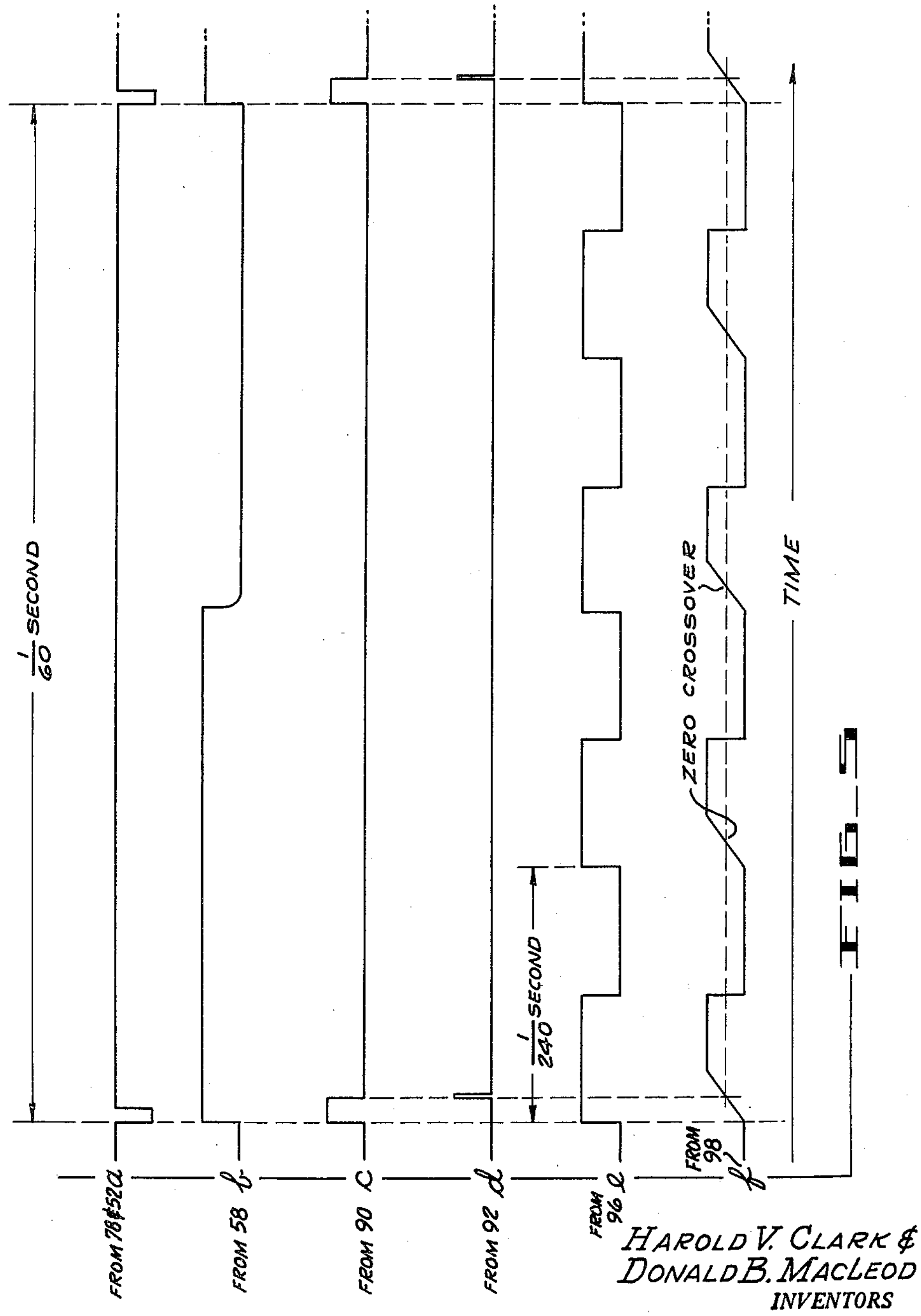
Figure 6:
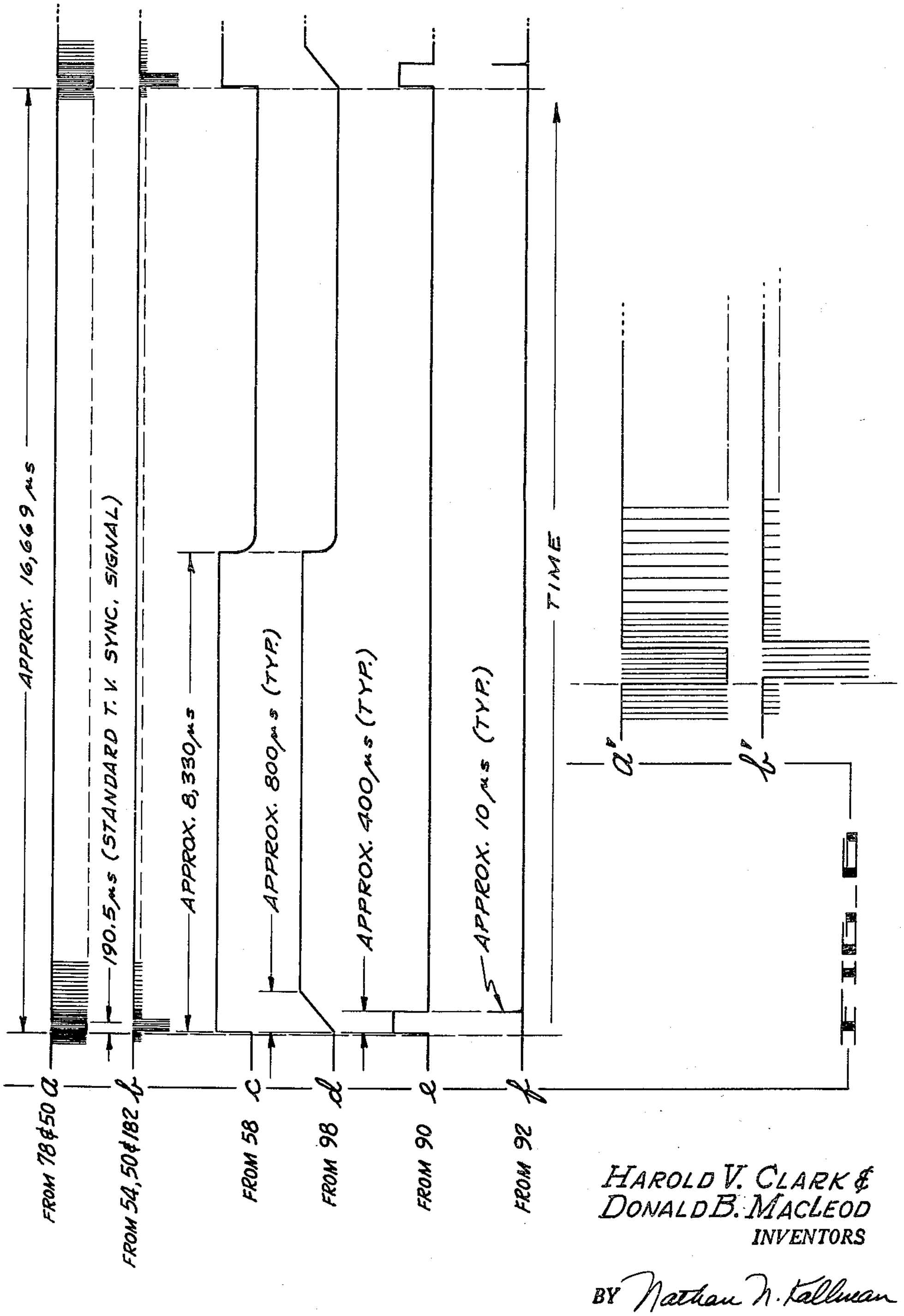
Figure 7:
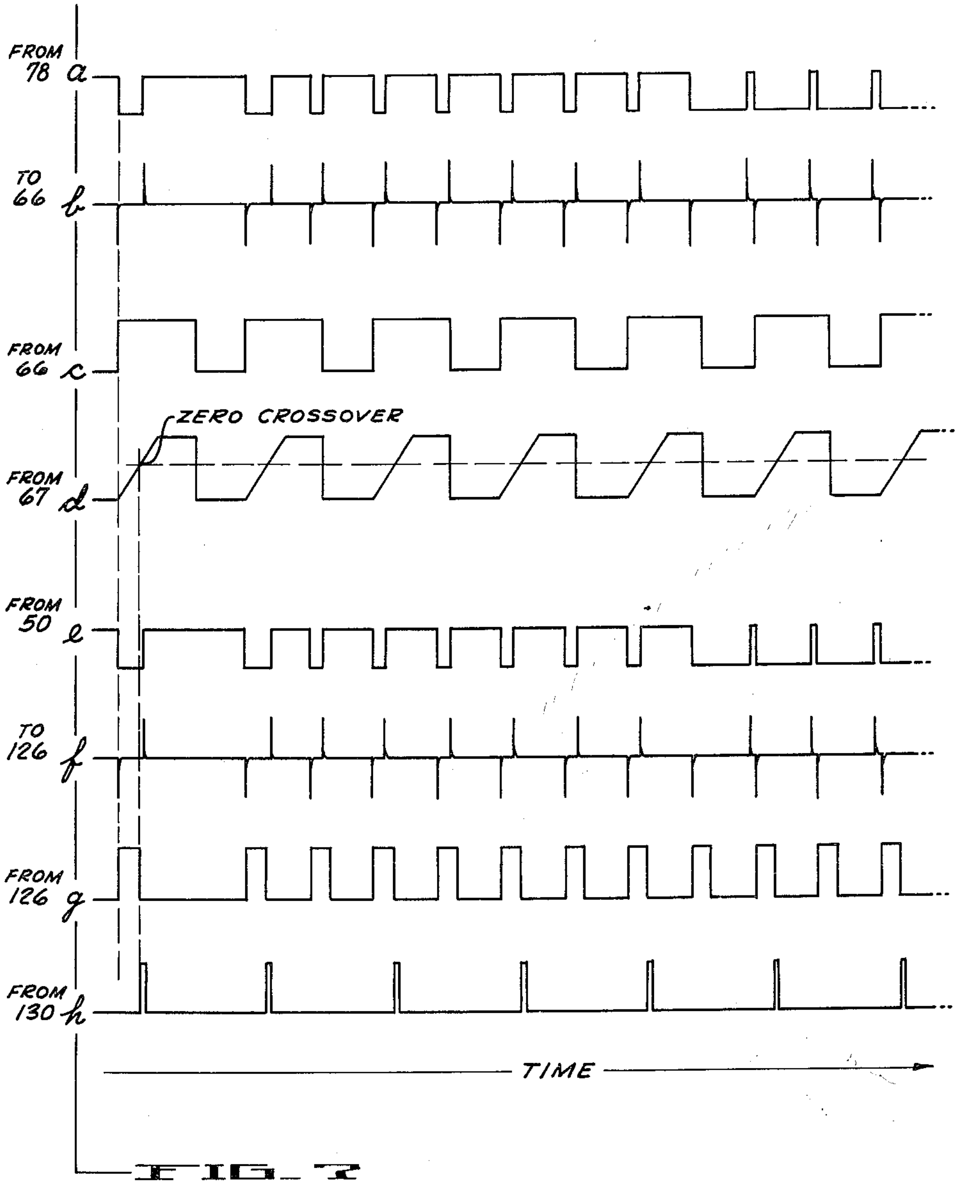
Figure 6:
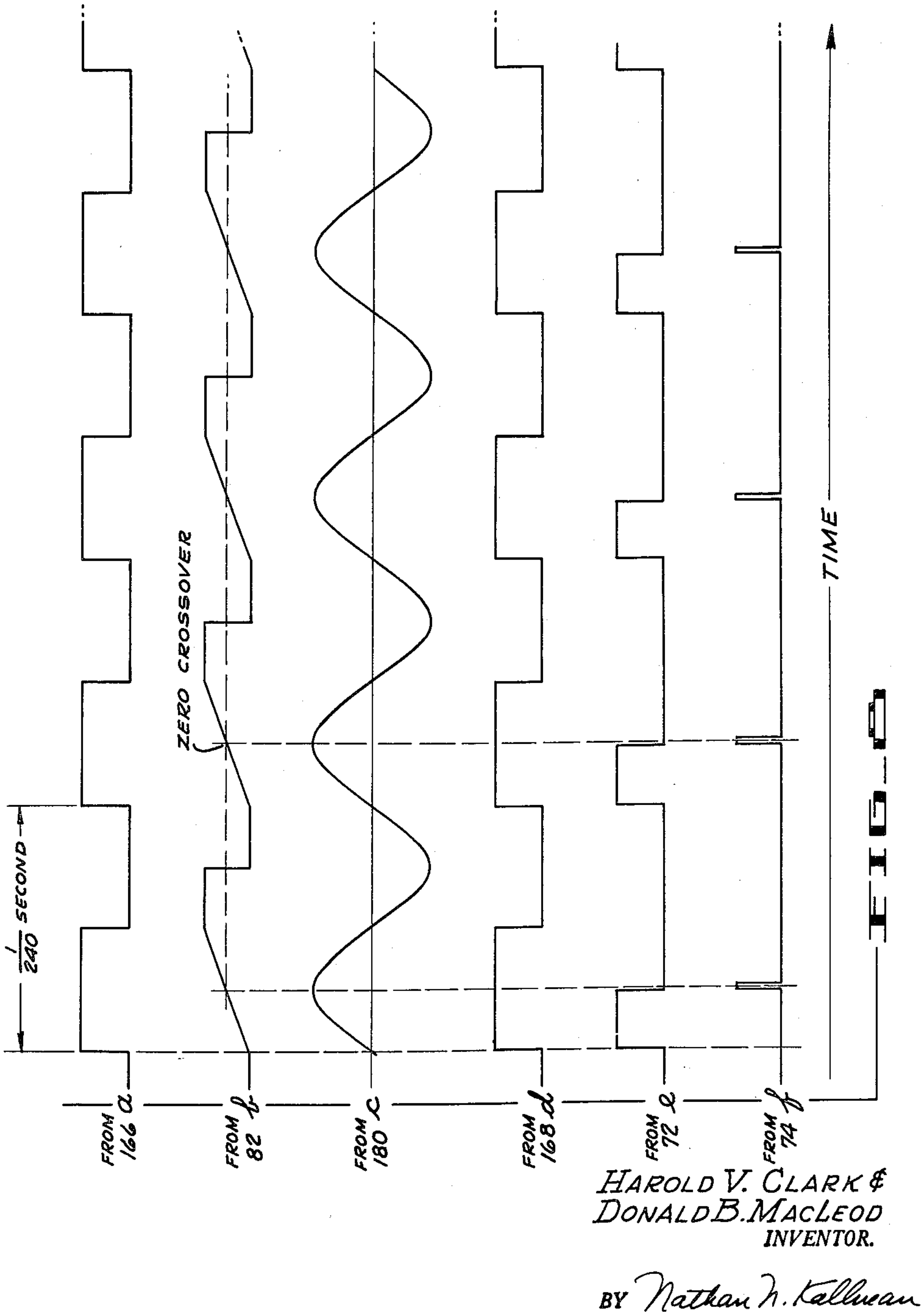

FIGURES 3*a* and 3*b* are functional block diagrams which illustrate the synchronizing system in greater detail. The system is shown with switches in "Snyc" and operating (O) positions during the "Playback" (P) mode. For the purpose of clarity, the following switch designanations are employed in the drawings:

SYNC—Synchronizer switched into overall system
NORMAL—Normal operation without synchronizer
O—Synchronizer system in operation
ST—Standby
R—"Record" mode
P—"Playback" mode
START—Starting or preliminary period during "Playback"
RUN—Continuous running in "Playback" mode.

In FIGURES 3*a* and 3*b*, a detail functional block diagram of the synchronizing system, in accordance with the invention, is illustrated.

During the "Record" mode, a synchronizing signal from a sync source 50, which may be an electronics processing amplifier that processes the composite video signal received from a television camera for example, is applied through a switch S1 (which is in the "Record" "R" position) to an impedance transducer 52. The vertical sync component is separated from the sync signal by a separator 54 and is fed to a trigger amplifier 56 which fires a monostable multivibrator 58 to develop a square wave. At the same time the horizontal sync component is passed through a differentiating circuit comprising a resistor 62 and a capacitor 64 for application to a monostable multivibrator 66. The output of the multivibrators 58 and 66 are fed to an "AND" gate 60 which detects the positive going edges of the square waves which are produced by each of the multivibrators. The vertical sync component provides a positive going edge which is coincident with a positive going edge of the horizontal sync component only once per frame. Therefore the pulse output from the "AND" gate 60 which is a coincidence circuit, occurs at a 30 cycle repetition rate. A pulse shaper 68 stretches the pulse from the "AND"

gate 60 to provide an edit pulse which occurs upon the appearance of the first serration of each alternate vertical sync pulse. The edit pulse is passed through a switch S2, directed to the control track of a "Record" amplifier to provide an edit pulse reference signal which is to be utilized during the "Playback" mode for controlling the capstan at the start of "Playback."

In the "Playback" or "Reproduce" mode, during an initial period of 3 to 5 seconds, the synchronizing apparatus is in a "Start" position. The "Playback" signal from the control track on the magnetic tape is applied to an edit pulse separator 70 (FIGURE 3*b*) which applies the recorded edit pulses (as in FIGURE 4*a*) to a delay circuit 72 through a switch S3 (which is in the "Start" position). The "Playback" signal is derived from the magnetic tape through a control track head and an electronics processing circuit which is generally used for the processing of signal information in magnetic tape apparatus. The output of the delay circuit 72 (shown in FIGURE 4*b*) is passed to a pulse shaper 74 (FIGURE 4*c*) which provides a narrow pulse every 1/30 second to a sampler gate 76.

Concurrently, a sync signal is derived from a source of reference sync 78 (FIGURE 3*a*) through the impedance transducer 52 and a vertical sync component is separated by the separator 54. The vertical sync component is passed through the trigger amplifier 56 and the monostable multivibrator 58 for application to the "AND" gate 60. A 30 cycle sharp pulse (shown in FIGURE 4*d*) is produced for every alternate field in coincidence with the first serration of every alternate vertical synch pulse. The narrow pulse from the "AND" gate is applied to a monostable multivibrator 80 (FIGURE 3*b*), which is triggered to provide a pulse (FIGURE 4*e*) to a shaper 82 which produces a trapezoidal type waveform (FIGURE 4*f*). The trapezoidal waveform appears at the gate 76 where the pulse from the shaper 74 samples the trapezoid. If the pulse from the shaper 74 is not coincident with the zero crossover of the sloping portion of the trapezoid, an error voltage or control signal is derived and stored in a storage capacitor 84. The control signal in the capacitor 84 appears across a reactance tube 86 which controls a 60 cycle oscillator 192 that is coupled to the capstan motor drive by a switch S12. Since the edit pulse which is used to sample the trapezoid developed from the reference sync signal is derived from the same circuitry during "Recording" and during "Playback," the speed of the capstan motor drive may be varied by utilization of the recorded edit pulses and reference sync signals to provide a proper relation of tape position with respect to the equivalent reference sync signal in the "Recording" mode.

During the "Start" operation, all the relays are in the "Record" position except the relay switches S1, S4 and S12 which are marked by asterisks in the drawing. After the "Start" or initial period of adjustment, which may last for 3–5 seconds for example, the 240 cycle control signal is received from the 240 cycle control track to energize a relay actuator 112. The relay actuator 112 actuates the relay switches between "Playback" and "Record," and "Start" and "Run." However, the relay switches S1, S4, and S12 are always in the "Playback" position during the "Playback" mode.

With the relay switches in the "Record" position, except for switches S1, S4 and S12, a reference sync signal derived from the source of reference sync 78 is passed through the impedance transducer 52 which provides an output, as in FIGURE 5*a*, to the separator 54. The vertical sync component is derived from the separator 54 and applied to the trigger amplifier 56, and then to the monostable multivibrator 58. The output from multivibrator 58 (shown in FIGURE 5*b*) is then applied through a switch S5 to a trigger amplifier 88 for application to a delay multivibrator 90 which provides a pulse, as in FIGURE 5*c*. The output from the multivibrator 90 is processed by a pulse shaper 92, and the shaped pulse (FIGURE 5*d*) is applied to a gate 94.

Simultaneously, a 240 cycle square wave signal is derived from the photoelectric cell and channeled through a clipper and limiter 96, and the clipped pulse (FIGURE 5*e*) is directed through a switch S6 to a shaper 98. The output of the pulse shaper 98 (FIGURE 5*f*) is then fed through an impedance transducer 100 to the gate 94 at a 240 cycle rate. Every fourth pulse of the 240 cycle signal which is derived from the photoelectric cell is compared with each 60 cycle signal derived from the pulse shaper 92. If the output of the photoelectric cell is not in phase with the pulses (FIGURE 5*d*) appearing at the output of the pulse shaper 92, a phase error control signal is developed and a control voltage is stored at a storage capacitor 102. The phase error control voltage is applied through an impedance transducer 104 and a switch S7 (in the "Playback" position) to a 60 cycle chopper 106. The output of the 60 cycle chopper 106 is applied through an amplifier 108 to a compensating device 110, which may be a resolver motor for example. The resolver motor acts to shift the phase of a phase shifter 112 or resolver, thereby shifting the phase of a 240 cycle control signal that controls the scanning drum motor drive.

The compensating device 110 applies its correction to the phase shifter as long as a control voltage appears at the capacitor 102, which indicates that the vertical synchronizing pulse is not coincident with the pulse developed by the photoelectric cell. However, when such coincidence occurs, the pulse from pulse shaper 92 is coincident with the zero cross-over point of the trapezoidal waveform which is applied to the gate 94, and no control voltage appears at the capacitor 102.

The synchronizing system also operates to provide vertical sync adjustment during the "Start" period. In FIGURES 3*a* and 3*b*, a source of reference sync signal 78 comprising a 60 cycle vertical sync component and a 15,750 cycle horizontal sync component having waveforms, such as shown in FIGURE 6*a*, is applied to a sync separator 54 through an impedance transducer 52 for separation of the vertical and horizontal sync components. The output of the separator 54, which comprises a waveform, as shown in FIGURE 6*b* is amplified by a trigger amplifier 56. The first serration appearing in each vertical sync pulse triggers a monostable multivibrator 58 to produce a substantially square wave, such as shown in FIGURE 6*c*.

To develop the signal which is necessary to drive the drum motor at 240 r.p.s. so that it will be positively indexed with relation to vertical sync, the vertical reference signal from the monostable multivibrator 58 is directed through a switch S11 to a ringing oscillator circuit 150. The ringing oscillator 150 includes an LC network which generates a damped train of oscillations from the pulses that are fed to the circuit. The output of the ringing oscillator 150, which has a decaying characteristic, is coupled to a clipper amplifier 152 from which a square wave is passed through a 240 cycle band pass filter 154. The output of the band pass filter 154 is a constant amplitude 240 cycle sine wave signal which is directly locked in phase to the incoming 60 cycle pulses from the reference sync source 78.

If the scanning drum of the magnetic tape apparatus is rotating at such a velocity so that the sync signals, vertical and horizontal, that are registered on the tape, are coincident with the sync signals from the reference sync source 78, then the 240 cycle sine wave signal passes through a phase shifter 112, impedance transducer 158, phase modulator 142, impedance transducer 144, and operating switch S10, in that order, to the scanning drum without any significant change in phase. The rotational speed of the scanning drum is controlled by this 240 cycle signal and if there is no change in the phase of the signal as it passes through the phase shifter 112 and the modulator 142, there is no correction applied to vary the drum speed. This is indicative of an ideal precisely synchronized condition.

In one form of adjustment for the maintenance of a steady 240 r.p.s. rotation velocity, the signal from the photoelectric cell which comprises the 240 cycle square wave is fed through the clipper and limiter 96 to a frequency discriminator 164, for deriving a frequency error control voltage. The signal derived from the photoelectric cell is compared with the reference voltage for the derivation of a frequency error control signal. The frequency error control voltage from the discriminator 164 is applied to the control signal amplifier 138, thereby changing the phase modulated signal which is applied to the scanning drum motor drive. Thus any variations in the 240 cycle square wave of the photoelectric cell is detected by the frequency discriminator and corrected.

However, when the tape apparatus is in operation, the instantaneous angular position or velocity of the scanning drum may vary over narrow limits as a result of changes in tape pressure, splices, walking bearings, uneven stator windings in the driving motor, and the like. Small variations in motor speed may also arise with the use of a three-phase hysteresis synchronous motor, which is generally utilized in several types of television tape recorders. In accordance with this invention, instantaneous positional information from the video head scanning drum is obtained for each few degrees of rotation, such as each 5 degrees, and this information is utilized to actuate a rapid acting servo system to apply rapid correction to the driving motor.

In order to achieve the desired phase synchronization, the 240 cycle sine wave signal is modified by the phase shifter 112 and phase modulator 142 whenever a vertical error control signal or a horizontal error control signal is developed, as described hereinafter.

To effect an adjustment for vertical phase error, which is applied to the scanning drum, a sampling pulse from the pulse shaper 92 is compared with the leading slope of a trapezoidal waveform applied to the gate 94 from the shaper 98 and impedance transducer 100. The trapezoidal waveform produced by the pulse shaper 98 is derived from the source of reference sync 78, as shown in FIGURE 6*a* and passed to the separator 54 through a switch S1 and impedance transducer 52. The vertical sync component is separated by the separator 54, and the separated component (FIGURE 6*b*) is utilized to trigger the monostable multivibrator 58 by means of the energized trigger amplifier 56. The delayed pulse shown in FIGURE 6*c* from the monostable multivibrator 58 is then passed through the switch S6 to the shaper 98. The shaped pulse, FIGURE 6*d*, is then applied to the gate 94 through the impedance transducer 100.

Simultaneously, the tape sync signal, as in FIGURE 6*a*, is derived from the terminal 50 and applied through a separator 182 for separation of the vertical sync component. The vertical sync component, such as shown in FIGURE 6*b*, is passed through the switch S5 and trigger amplifier 88 to produce a pulse from the delay multivibrator 90, such as shown in FIGURE 6*e*. The delayed pulse is then shaped by the pulse shaper 92 to provide a waveform as in FIGURE 6*f*. The pulse from the pulse shaper 92 samples the output from the shaper 98 and the impedance transducer 100 to provide a vertical phase error control voltage which is stored in the capacitor 102. Any stored voltage is passed through the impedance transducer 104 to energize the relay actuator 120, thereby switching the relay switch S14 to the "V" or "Vertical" position. The error control voltage is thereby applied through S7 to the 60 cycle chopper 106 and amplifier 108 to actuate the compensating device 110. The compensating device 110 acts to energize the phase shifter 112 thereby varying the phase of the 240 cycle control signal which is applied to the scanning drum motor drive.

In addition, a frequency error control voltage is derived from the frequency discriminator 160 which receives the tape sync signals from the terminal 50. The frequency error control voltage is applied through a switch S15 to the control signal amplifier 138 which applies a control signal to the phase modulator 142. Variations in frequency of the tape sync components are detected by the discriminator 160 to vary the frequency of the 240 cycle control signal thereby maintaining the scanning drum or drive at a substantially constant speed.

After the adjustment for vertical synchronization has been achieved, there is no error voltage appearing at the capacitor 102. This causes the relay actuator 120 to switch the apparatus from the "vertical adjustment" position, designated as "V," to a "horizontal adjustment" position, designated as "H" in the figures.

When the synchronizing system is in position for the "horizontal phase and frequency adjustment," the horizontal sync component is derived from the source of reference sync 78, FIGURE 7*a*, through the impedance transducer 52 and the differentiating circuit comprising the resistor 62 and the capacitor 64. The differentiated horizontal sync component, FIGURE 7*b*, appears at the monostable multivibrator 66. The output, FIGURE 7*c*, from the multivibrator 66 is processed by shaper 67 which develops a trapezoid type waveform, FIGURE 7*d*, having a sloping leading edge. The trapezoidal waveform is applied through an impedance transducer 70 to the gate 134 where the sampling pulse from a shaper buffer 132 is mixed with the trapezoid.

Simultaneously, the synchronizing pulse, FIGURE 7*e*, received from the tape at the terminal 50 is applied through a differentiating circuit comprising a capacitor 122 and resistor 124. The horizontal sync component, FIGURE 7*f*, is passed by the differentiating circuit to a delay multivibrator 126 which generates a delayed pulse, FIGURE 7*g*. The negative going portion of the delayed pulse drives an impedance transducer 128 and a blocking oscillator 130 which provides a pulse, FIGURE 7*h*, that is applied to a shaper buffer 132. The pulse from the blocking oscillator 130 is fed through the shaper buffer 132 to serve as a sampling pulse that is applied to a gate 134. The buffer 132 is utilized to isolate the blocking oscillator from any feedback from the gate 134.

The sampling pulse, FIGURE 7*h*, samples the trapezoid, FIGURE 7*d*, in the gate 134 to provide a horizontal error control voltage that is stored in a storage capacitor 136. The error control voltage is directed to the control signal amplifier 138 through an impedance transducer 140 and a switch S9. The control signal amplifier 138, which may be a D.C. amplifier and a phase lead network such as is commonly used in servomechanism systems, is applied to a phase modulator 142.

The phase modulator varies the speed of the scanning drum drive through an impedance transducer 144 and switch S10 thereby positioning the scanning drum in proper relation to the horizontal sync components.

In addition, the control voltage which appears at the capacitor 136 is passed through the impedance transducer 140 and through the relay switch S7 to the 60 cycle chopper 106. The converted 60 cycle control signal is then applied through amplifier 108 to the compensating device 110 for actuating the phase shifter 112. The phase shifter 112 which is in the servo control loop acts to change the phasing of the 240 cycle control signal to the scanning drum motor drive. This action continues until the control voltage at the capacitor 136 becomes zero.

During the "Run" mode, an additional control is provided for the capstan motor drive speed. This is achieved by providing a sampling pulse to the pulse shaper 74 for sampling a signal representative of the 240 cycle sine wave signal which is derived from the control panel of the magnetic tape apparatus.

To accomplish this sampling, the photoelectric cell provides a 240 cycle square wave which is passed through the clipper and limiter 96 to an inverter 166 which produces an output, such as shown in FIGURE 8*a*. The inverted square wave is applied through a switch S8 to the shaper 82 which provides a trapezoidal waveform such as shown in FIGURE 8*b*. Simultaneously, the 240 cycle control signal as shown in FIGURE 8*c* appears at the terminal 180 and is applied through an amplifier 188 to the shaper 168. The shaper 168 provides a square waveform, as in FIGURE 8*d* which is channeled through an amplifier 190 and a switch S3 to the delay circuit 72. The delay circuit 72 provides a delayed pulse as in FIGURE 8*e* which appears at the pulse shaper 74 as a sampling pulse. The 240 cycle sampling pulse samples the 240 cycle signal derived from the photoelectric cell and produces an error control voltage which is stored in the storage capacitor 84. The error control voltage varies the reactance of reactance tube 86 which varies the frequency output from an oscillator 192 which is normally 60 cycles. The output of the oscillator 192 in turn adjusts the frequency of the capstan motor drive through the switch S12 to maintain a substantially precise tape speed.

It will be understood that the synchronizing system of this invention is applicable to color television as well as monochrome systems. Also, if it is not desired to employ the synchronizing system per se, a switch is provided for conversion to "Normal" or "N" operation during which a 60 cycle power supply is utilized. Also, as a feature, an indicating light 196 such as a neon bulb, may be provided to indicate that the system is providing correction for vertical phase error.

There has been described herein a synchronizing system for synchronizing a magnetic tape apparatus with another information processing apparatus wherein information sync pulses of different frequencies are compared with reference sync pulses to maintain a magnetic tape scanning drum and capstan in proper relationship with the signal information prerecorded on the tape and with the signal information from the other apparatus, thereby affording precise synchronization between the two sources of information.

What is claimed is:

1. A signal synchronizing system for synchronizing a magnetic tape apparatus with another independent information processing apparatus comprising: a source of composite sync signal derived from said magnetic tape apparatus having a plurality of sync components; means for separating said composite sync signal into at least a first sync component and a second sync component, said second sync component having a substantially greater frequency than said first sync component; a source of reference signal comprising a plurality of sync components corresponding to said at least a first sync component and a second sync component; means for separating said reference signal into a first reference sync component and a second reference sync component corresponding respectively to said first and second sync components derived from the said tape apparatus; means for comparing said separated first sync components for producing a first error control signal; means for comparing said separated second sync components for producing a second error control signal; and means for utilizing said error control signals to vary the rotational velocity of a scanning means of said tape apparatus.

2. A signal synchronizing system for synchronizing a magnetic tape apparatus with another source of signal information, said apparatus having a rotatable scanning drum driven by a rotary driving means comprising: a source of composite video signal derived from said magnetic tape apparatus, said composite video signal including a first synchronizing pulse signal having a predetermined frequency, and a second related synchronizing pulse signal having a frequency several times greater than said predetermined frequency; a source of reference signal comprising a first synchronizing pulse having said predetermined frequency and a second synchronizing pulse having said greater frequency; means for separating said signals; comparator means for comparing said signals of predetermined frequencies and said signals of greater frequencies to develop phase error signals, coupled to said separating means; and means for applying said error signals to phase shifting means for varying the instantaneous position of said driving means and said scanning drum.

3. In a signal transmission system having a rotary means for scanning information recorded on a magnetic tape for reproducing said information; a first source of video signal information; a second source of video signal information recorded on a magnetic tape; a reference signal sync generator for providing first and second reference signals; means for separating the signal information from said second source into first and second signal components; a first means for comparing said first reference signal and said first signal component for deriving a phase error signal; a second means for comparing said second reference signal and said second signal component for deriving a second phase error signal; and means for varying the angular velocity of said scanning means with respect to said first and second error signals in sequence so that said recorded information is synchronized with said first source of video signal information whenever there is switching between said sources.

4. In a signal transmission system having a rotary means for scanning information recorded on a magnetic tape for reproducing said information: a source of video signal information recorded on a magnetic tape, a reference sync signal source for providing first and second reference signals; means for separating said video signal information into horizontal sync and vertical components, a first means for comparing said first reference signal and said vertical sync component for deriving a vertical phase error signal; a second means for comparing said second reference signal and said horizontal sync component for deriving a horizontal phase error signal; and means for varying the angular velocity of said scanning means sequentially in accordance with said vertical and horizontal phase error signals so that said recorded information is reprdouced in synchronism with said reference sync signals.

5. In a television transmission network, a signal synchronizing system including a rotary scanning drum comprising: a source of horizontal and vertical sync components derived from a composite video information signal pre-recorded on a magnetic tape; a reference signal source comprising reference horizontal and vertical signal components corresponding to said horizontal and vertical sync components derived from said tape; means for separating said horizontal components from said vertical components; phase comparator means for comparing the phase of said vertical sync components to derive a phase error control signal; phase comparator means for comparing said horizontal sync components for deriving a phase error control signal, a frequency discriminator for deriving a frequency error control voltage from said horizontal sync component derived from said tape; a phase shifter responsive to said phase error signals for shifting the phase of a control signal for controlling the speed of said scanning drum; and a phase modulator for varying the rotataional velocity of said scanning drum in response to said frequency error control signal.

References Cited in the file of this patent

UNITED STATES PATENTS

| | | |
|---|---|---|
| 2,916,546 | Ginsburg et al. | Dec. 8, 1959 |
| 2,944,108 | Houghton | July 5, 1960 |